United States Patent
Hsu et al.

(10) Patent No.: US 11,010,521 B2
(45) Date of Patent: May 18, 2021

(54) METHOD OF DETECTING RELATIONS BETWEEN PINS OF CIRCUIT AND COMPUTER PROGRAM PRODUCT THEREOF

(71) Applicant: REALTEK SEMICONDUCTOR CORPORATION, Hsinchu (TW)

(72) Inventors: Chia-Ling Hsu, Taoyuan (TW); Ting-Hsiung Wang, Kaohsiung (TW); Meng-Jung Lee, Taoyuan (TW); Yu-Lan Lo, Hsinchu County (TW); Shu-Yi Kao, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/920,859

(22) Filed: Jul. 6, 2020

(65) Prior Publication Data

US 2021/0012050 A1 Jan. 14, 2021

(30) Foreign Application Priority Data

Jul. 11, 2019 (TW) ................. 108124518

(51) Int. Cl.
*G06F 30/3312* (2020.01)
*G06F 30/398* (2020.01)
*G06F 30/3315* (2020.01)
*G06F 119/12* (2020.01)

(52) U.S. Cl.
CPC ...... *G06F 30/3312* (2020.01); *G06F 30/3315* (2020.01); *G06F 30/398* (2020.01); *G06F 2119/12* (2020.01)

(58) Field of Classification Search
CPC ............... G06F 30/3312; G06F 30/398; G06F 30/3315; G06F 2119/12
USPC ......................................... 716/113
See application file for complete search history.

(56) References Cited

U.S. PATENT DOCUMENTS

| | | | | |
|---|---|---|---|---|
| 5,452,239 A | * | 9/1995 | Dai ..................... | G06F 30/34 703/19 |
| 5,581,738 A | * | 12/1996 | Dombrowski .......... | G06F 30/33 716/104 |
| 6,263,483 B1 | * | 7/2001 | Dupenloup ............. | G06F 30/30 716/104 |
| 6,442,739 B1 | * | 8/2002 | Palermo .............. | G06F 30/3312 716/108 |
| 6,658,635 B1 | * | 12/2003 | Tanimoto ............ | G06F 30/3312 716/108 |
| 7,308,656 B1 | * | 12/2007 | Roberts .......... | G01R 31/318536 703/16 |
| 8,117,577 B1 | * | 2/2012 | Vadi ....................... | G06F 30/34 716/108 |

(Continued)

*Primary Examiner* — Suresh Memula
(74) *Attorney, Agent, or Firm* — WPAT, PC

(57) ABSTRACT

A method of detecting the relations between the pins of a circuit and a computer program product thereof are provided. The method includes: retrieving a circuit description file describing a circuit; retrieving at least one data pin and at least one clock pin of the circuit; converting the circuit to a cell level; and tracing the circuit in the cell level to identify multiple flip-flops coupled to the clock pin; tracing the circuit in the cell level to identify a target flip-flop coupled to the data pin; and determining whether the data pin is related to the clock pin according to the data signal and the clock signal of the target flip-flop.

18 Claims, 10 Drawing Sheets

(56) References Cited

U.S. PATENT DOCUMENTS

| | | | |
|---|---|---|---|
| 8,185,854 B1* | 5/2012 | Hutton | G06F 30/3312 |
| | | | 716/108 |
| 8,365,113 B1* | 1/2013 | Bhardwaj | G06F 30/30 |
| | | | 716/106 |
| 8,745,561 B1* | 6/2014 | Garg | G06F 30/00 |
| | | | 716/113 |
| 8,977,995 B1* | 3/2015 | Arora | G06F 30/327 |
| | | | 716/105 |
| 8,977,998 B1* | 3/2015 | Azizi | G06F 30/3312 |
| | | | 716/108 |
| 9,003,341 B2 | 4/2015 | Yu et al. | |
| 9,171,116 B1* | 10/2015 | Zhang | G06F 30/327 |
| 9,842,187 B1* | 12/2017 | Zejda | G06F 30/398 |
| 10,162,918 B1* | 12/2018 | Iyer | G06F 30/3312 |
| 10,223,493 B1* | 3/2019 | Spyrou | G06F 30/3312 |
| 10,247,777 B1* | 4/2019 | Bernard | G01R 31/318566 |
| 10,678,983 B1* | 6/2020 | Sun | G06F 30/337 |
| 2003/0192018 A1* | 10/2003 | Baumgartner | G06F 30/33 |
| | | | 716/108 |
| 2007/0226667 A1* | 9/2007 | Chadwick, Jr. | G06F 30/3312 |
| | | | 716/113 |

* cited by examiner

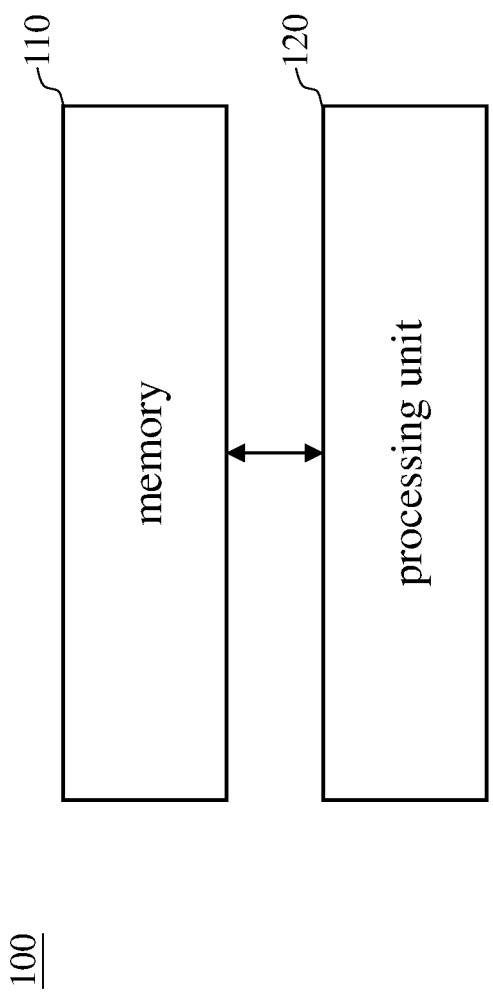

S910 — when the data pin is determined to be related to a first clock pin coupled to the selection circuit, determining that the data pin is related to a second clock pin coupled to the selection circuit

FIG. 9

S1010 — stopping tracing the circuit when the power node or the ground node is identified

METHOD OF DETECTING RELATIONS BETWEEN PINS OF CIRCUIT AND COMPUTER PROGRAM PRODUCT THEREOF

BACKGROUND OF THE INVENTION

1. Field of the Invention

The present invention relates to the static timing analysis (STA) of integrated circuits (ICs), and, more particularly, to a method of detecting the relations between the pins of a circuit and the computer program product thereof.

2. Description of Related Art

In the field of integrated circuits (ICs), after a circuit module with a predetermined function is designed, the circuit is usually subjected to the static timing analysis (STA) to make sure the timing between the data signals and clock signals is correct. A circuit module is in signal connection with other circuit modules through its interfaces, which usually include multiple data pins and multiple clock pins. Because the STA needs to know the mappings between the data pins and the clock pins (i.e., the relations between the data pins and the clock pins), the STA may fail to find out the timing errors in the circuit module if the relations between the data pins and the clock pins are incomplete or incorrect. Therefore, a reliable method is necessary to detect or determine the relations between the data pins and the clock pins of the IC.

SUMMARY OF THE INVENTION

In view of the issues of the prior art, an object of the present invention is to provide a method of detecting the relations between the pins of a circuit and the associated computer program product, so as to improve the reliability of STA.

A method of detecting relations between the pins of a circuit is provided. The method includes the following steps: (A) retrieving a circuit description file describing the circuit; (B) retrieving at least one data pin and at least one clock pin of the circuit; (C) tracing the circuit in a cell level to identify multiple flip-flops coupled to the clock pin; (D) tracing the circuit in the cell level to identify a target flip-flop coupled to the data pin; and (E) determining whether the data pin and the clock pin are related according to a data signal and a clock signal of the target flip-flop.

A computer program product is also provided. The computer program product includes multiple program instructions. After a computer loads and executes the program instructions, the foregoing method of detecting relations between the pins of a circuit can be carried out.

According to the present invention, the method of detecting the relations between the pins of a circuit and the computer program product associated with the method can automatically determine the relations between the data pins and the clock pins of the IC. Compared with the traditional technology, the present invention can avoid human errors and improve the efficiency of circuit analysis.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 1A illustrates a device for detecting the relations between the pins of an IC according to an aspect of the present invention.

FIG. 9 illustrates a detailed flow of an embodiment of step S370 in FIG. 3.

FIG. 10 illustrates a sub-step of an embodiment of steps S350 and S360 in FIG. 3.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

In the following description, the expression "element A is coupled to element B" means that element A is directly or indirectly connected to element B in a way that signals propagate from element A, pass multiple stages of intervening elements (if any), and finally reach element B.

FIG. 1A shows a device for detecting the relations between the pins of an IC according to an aspect of the present invention. The detection device 100 includes a memory 110 and a processing unit 120. The processing unit 120 may be a circuit or an electronic component having a program execution capability, such as a central processing unit (CPU), a microprocessor, or a micro processing unit, which detects the relations between the pins of the IC by executing the program codes or program instructions stored in the memory 110.

Figure 1B:
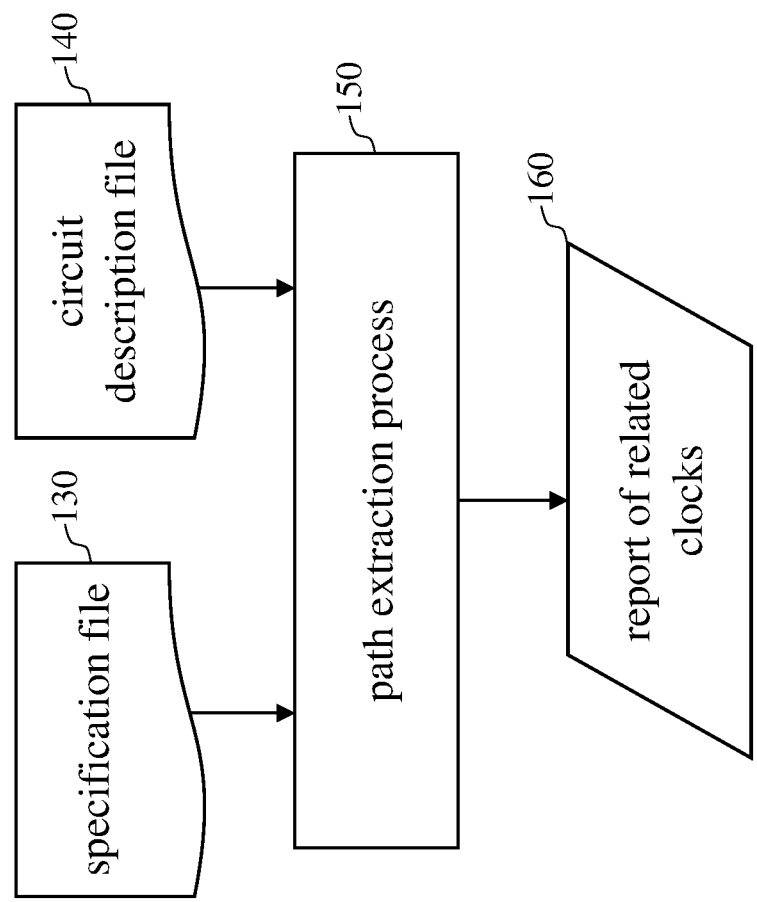
FIG. 1B illustrates a flowchart of a method of detecting the relations between the pins of an IC according to an embodiment of the present invention.

FIG. 1B shows a flowchart of a method of detecting the relations between the pins of an IC according to an embodiment of the present invention. The processing unit 120 reads the specification file 130 and the circuit description file 140 of the circuit to be detected and then performs a path extraction process 150 to generate a report of related clock pin(s) 160. The specification file 130 and the circuit description file 140 can be stored in the memory 110.

Figure 2:
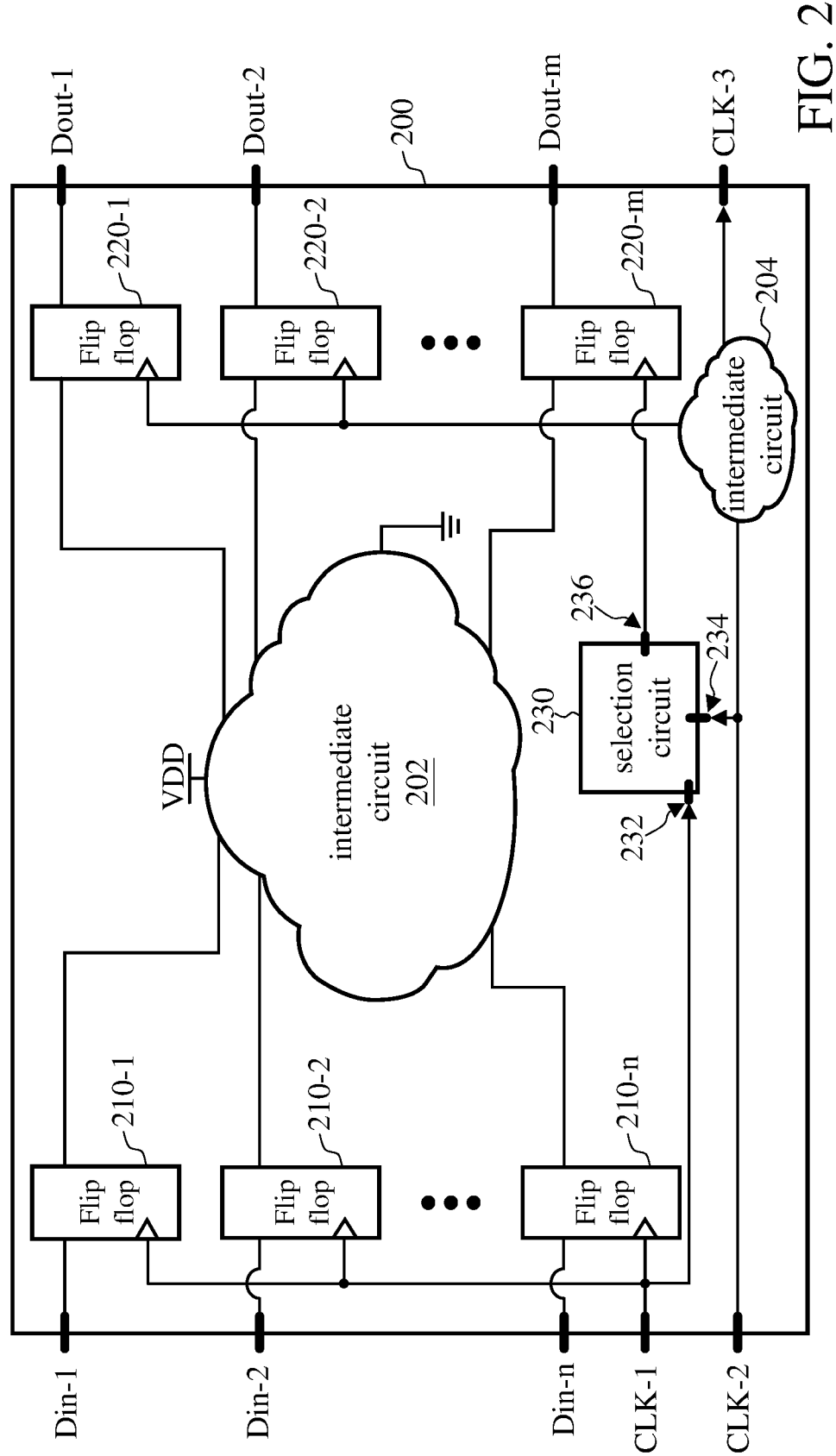
FIG. 2 illustrates a schematic diagram of an example of the IC discussed in the present invention.

FIG. 2 is a schematic diagram of an example of the IC discussed in the present invention. The IC 200 includes, for example, n input data pins Din (Din-1 to Din-n, n is a positive integer), n flip-flops 210 (210-1 to 210-n), m output data pins Dout (Dout-1 to Dout-m, m is a positive integer), m flip-flops 220 (220-1 to 220-*m*), the input clock pin CLK-1, the input clock pin CLK-2, the output clock pin CLK-3, the intermediate circuit 202, the intermediate circuit 204 and the selection circuit 230. The IC 200 may be one of the circuit modules in a system and is in signal connection or communicates with other circuit modules (not shown) through the input data pin Din, the output data pin Dout, the input clock pins CLK-1 and CLK-2, and the output clock pin CLK-3. Please note that the selection circuit 230 is intended to illustrate the invention by way of examples, rather than to limit the scope of the claimed invention. Other types of selection circuits may include any combinational logic (such as a multiplexer, a phase selector or a clock modulator), through which multiple clocks may be traced.

Figure 3:
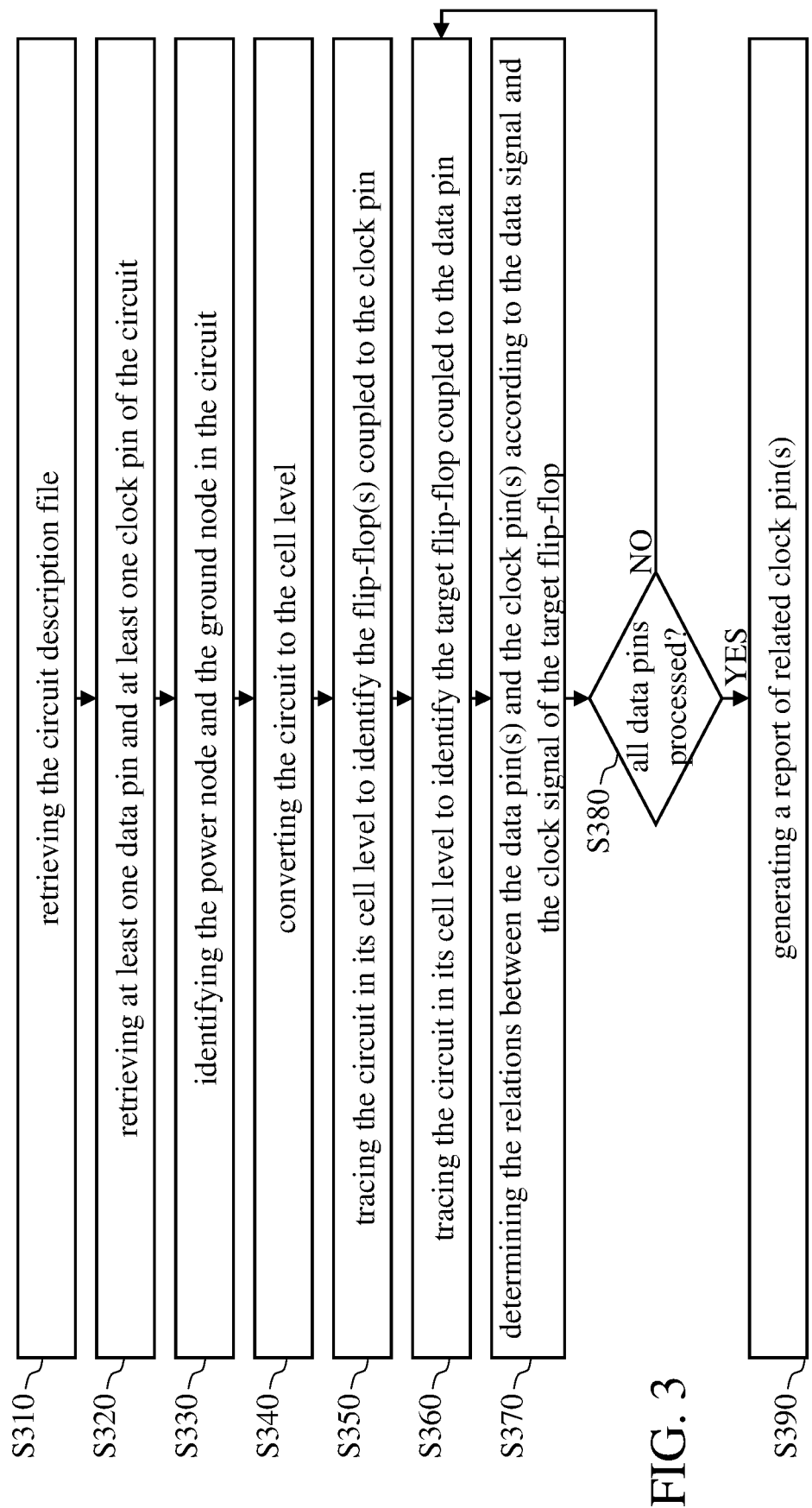
FIG. 3 illustrates a flowchart of an embodiment of the path extraction procedure in FIG. 1B.

FIG. 3 is a flowchart of an embodiment of the path extraction procedure 150 of FIG. 1B. To better understand the following descriptions, reference is made to both FIG. 2 and FIG. 3 In the beginning, the detection device 100 first retrieves the circuit description file 140 (step S310). The circuit description file 140 describes the connections between multiple components of the IC 200. The circuit description file 140 may be a netlist generated by a schematic editor. The circuit description file 140 can be stored in the memory 110, and the processing unit 120 accesses the memory 110 to retrieve the circuit description file 140. By reading the circuit description file 140, the processing unit 120 can know the circuit architecture of the IC 200.

Next, the detection device 100 retrieves at least one data pin and at least one clock pin of the IC 200 (step S320). The data pins and clock pins can be listed or contained in the specification file 130 of the IC 200. The specification file 130 can be stored in the memory 110 after inputted to the detection device 100, and the processing unit 120 accesses the memory 110 to read the specification file 130. The specification file 130 may contain pins of interest to the user. In other words, the specification file 130 may contain all of the data pins of the IC 200 and all of the clock pins of the IC 200.

Next, the processing unit 120 identifies the power node (e.g., the power supply VDD in FIG. 2) and the ground node (e.g., the ground symbol in FIG. 2) in the IC 200 (step S330). In some embodiments, the power node and the ground node may be listed or contained in the specification file 130 of the IC 200, and the processing unit 120 learns the power node and the ground node of the IC 200 by reading or making reference to the specification file 130. The power node and the ground node can be used as the termination points of the signal paths of the circuit. In some embodiments, when tracing a signal path, the processing unit 120 stops tracing the signal path upon encountering a power node or a ground node. The signal path includes, but is not limited to, the data path and the clock path.

Next, the processing unit 120 converts the circuit to the cell level based on the circuit description file 140 (step S340). This step can be completed through the cluster analysis technique. Cluster analysis is well known to people having ordinary skill in the art. For more information, refer to the following URL: en.wikipedia.org/wiki/Cluster_analysis. The purpose of this step is to group several basic circuit elements (such as transistors, resistors, capacitors, inductors, etc.) into a standard cell of a specific function (such as an amplifier, filter, flip-flop, etc.) to thereby facilitate subsequent circuit tracing operations. This step can be regarded as clustering or approximating circuits (based on functions, for example) from the transistor level to the cell level. In some embodiments, this step may be conducted according to the hierarchy name of the IC 200.

Next, the processing unit 120 traces the circuit in its cell level to identify or find the flip-flop(s) coupled to the clock pin (step S350). In this step, the processing unit 120 starts tracing the circuit from a clock pin until a flip-flop in the circuit is identified or found. The clock pin serving as the start point of tracing can be the input clock pin of the IC 200 (e.g., the input clock pin CLK-1 and the input clock pin CLK-2 in FIG. 2) or the output clock pin of the IC 200 (e.g., the output clock pin CLK-3 in FIG. 2). The cases where the input clock pin is selected as the start point and the cases where the output clock pin is selected as the start point are respectively discussed as follows.

Case I: Where the Start Point of Tracing is the Input Clock Pin.

Figure 4:
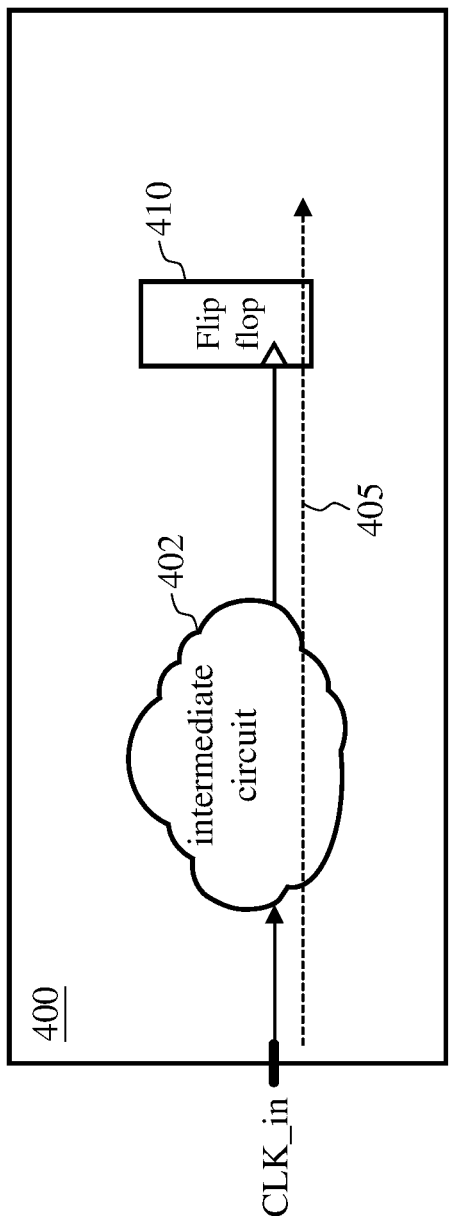
FIG. 4 illustrates a simplified schematic diagram of an IC to be detected.

Reference is made to FIG. 4 which is a simplified schematic diagram of an IC to be detected. In step S350, starting from the input clock pin CLK_in of the IC 400, the processing unit 120 traces the circuit in the signal transmission direction 405 until the clock pin of the flip-flop 410 is identified. The input clock pin CLK_in can be electrically connected to the clock pin of the flip-flop 410 directly or coupled to the flip-flop 410 through the intermediate circuit 402. The intermediate circuit 402 may contain standard cells.

As for the IC 200 in FIG. 2, in the case where the processing unit 120 traces the circuit from the input clock pin CLK-1 (i.e., the input clock pin CLK-1 serves as the start point), the processing unit 120 will identify the flip-flop 210-1, the flip-flop 210-2, the flip-flop 210-*n* and the flip-flop 220-*m*. The flip-flop 210-1, the flip-flop 210-2 and the flip-flop 210-*n* are directly coupled (connected) to the input clock pin CLK-1, whereas the flip-flop 220-*m* is coupled to the input clock pin CLK-1 through the selection circuit 230. In the case where the processing unit 120 traces the circuit from the input clock pin CLK-2 (i.e., the input clock pin CLK-2 serves as the start point), the processing unit 120 will identify the flip-flop 220-1, the flip-flop 220-2 and the flip-flop 220-*m*. The flip-flop 220-1 and flip-flop 220-2 are coupled to the input clock pin CLK-2 through the intermediate circuit 204, whereas the flip-flop 220-*m* is coupled to the input clock pin CLK-2 through the selection circuit 230. The intermediate circuit 202 and the intermediate circuit 204 may contain flip-flop(s) and other standard cells.

Case II: Where the Start Point of Tracing is the Output Clock Pin

Figure 5:
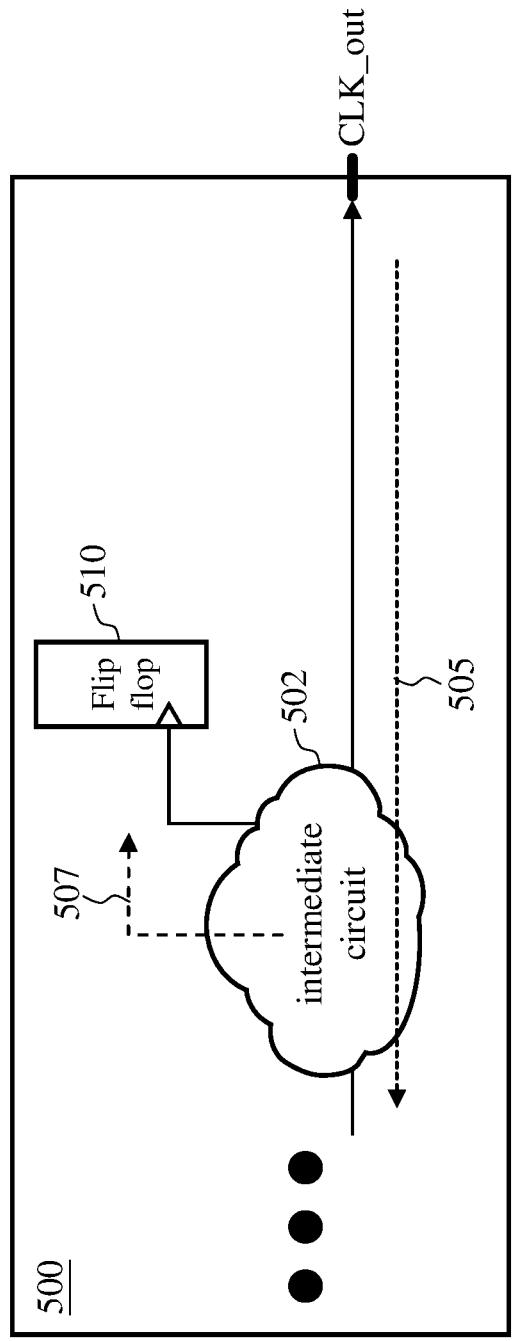
FIG. 5 illustrates another simplified schematic diagram of an IC to be detected.
Figure 6:
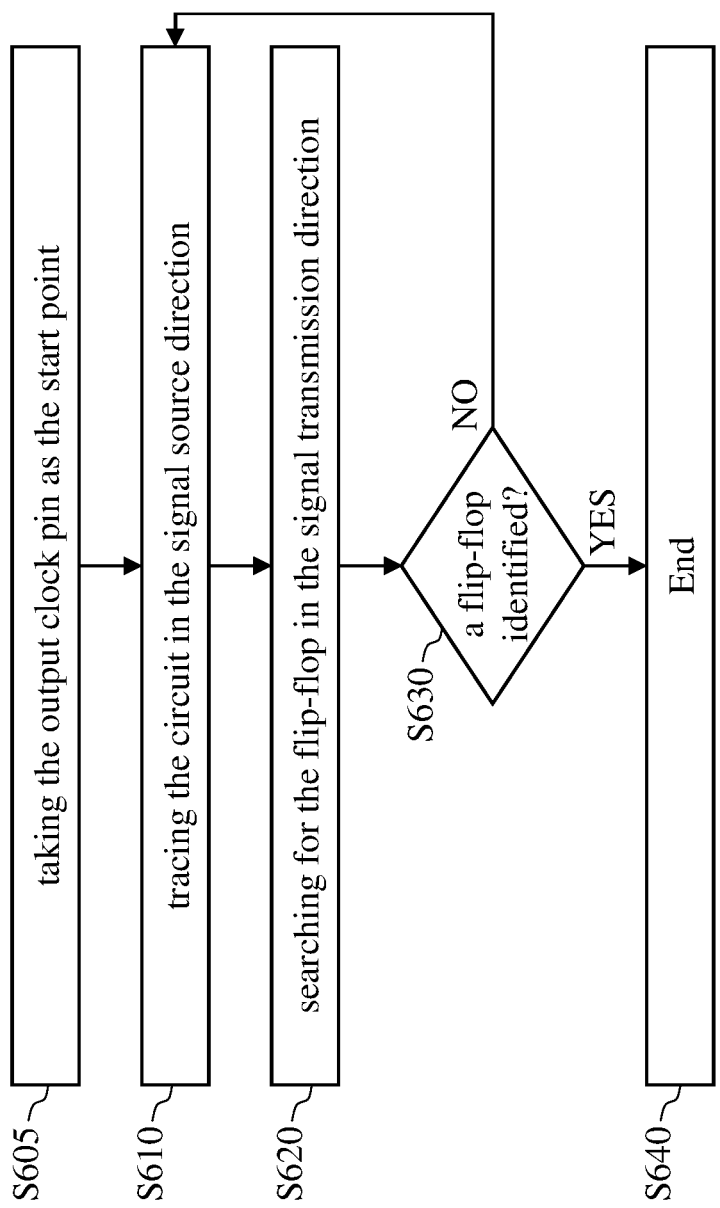
FIG. 6 illustrates a detailed flow of an embodiment of step S350 in FIG. 3.

Reference is made to FIGS. 5 and 6. FIG. 5 is another simplified schematic diagram of an IC to be detected, and FIG. 6 is a detailed flow of an embodiment of step S350 in FIG. 3. Starting from the output clock pin CLK_out of the IC 500 (step S605), the processing unit 120 traces the circuit in the signal source direction 505 (step S610), and then searches for the flip-flop in the signal transmission direction 507 after encountering or identifying the intermediate circuit 502 (Step S620). Next, the processing unit 120 determines whether a flip-flop is identified (step S630). If the result of step S630 is positive (e.g., the flip-flop 510 in FIG. 5 is identified), the processing unit 120 finishes the search for the flip-flop (step S640) (i.e., finishes step S350). If the result of step S630 is negative, the processing unit 120 repeats steps S610 and S620.

As for the IC 200 in FIG. 2, in the case where the processing unit 120 traces the circuit from the output clock pin CLK-3 (i.e., the output clock pin CLK-3 serves as the start point), the processing unit 120 will identify the flip-flop 220-1 and the flip-flop 220-2. The flip-flop 220-1 and flip-flop 220-2 are coupled to the output clock pin CLK-3 through the intermediate circuit 204.

Note that in one embodiment of the present invention, the processing unit 120 stops tracing the path after identifying the flip-flop in step S350. In some embodiments, if the processing unit 120 finds in step S350 that a flip-flop identified in step S340 is not coupled to the clock pin, the processing unit 120 rules out that flip-flop. In other words, this step can exclude the standard cell that was mistaken for a flip-flop in the previous step.

Reference is made to FIG. 3 again. After step S350 is completed, the processing unit 120 traces the circuit in its cell level to identify the target flip-flop coupled to the data pin (step S360). In this step, the processing unit 120 traces the circuit in its cell level from a certain data pin until a flip-flop is identified. The data pin serving as the start point of tracing may be the input data pin of the IC 200 (e.g., the input data pin Din in FIG. 2) or the output data pin of the IC 200 (e.g., the output data pin Dout in FIG. 2). The cases where the input data pin is selected as the start point and the cases where the output data pin is selected as the start point are respectively discussed as follows.

Case I: Where the Start Point of Tracing is the Input Data Pin.

Figure 7:
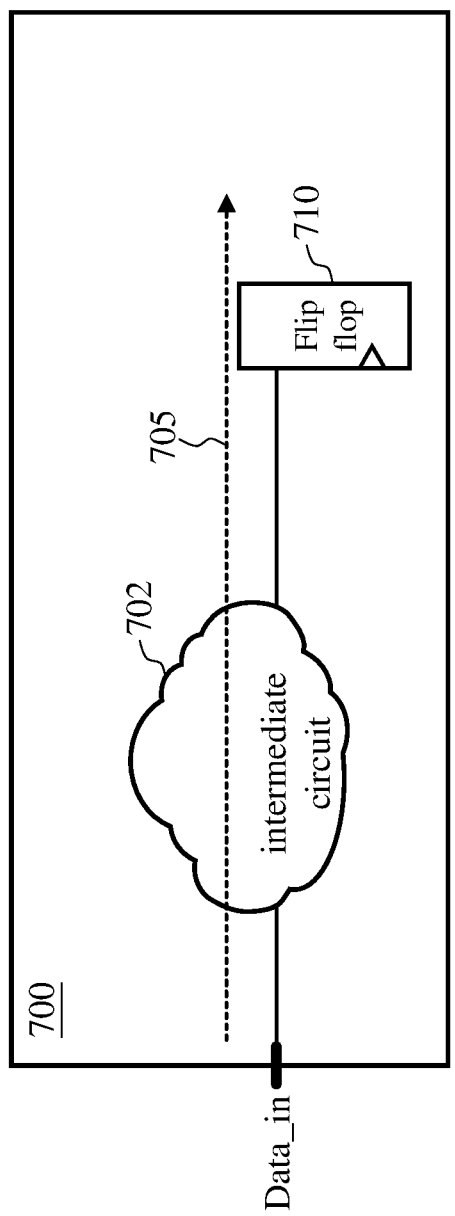
FIG. 7 illustrates another simplified schematic diagram of an IC to be detected.

Reference is made to FIG. 7 which is another simplified schematic diagram of an IC to be detected. In step S360, starting from the input data pin Data_in of the IC 700, the processing unit 120 traces the circuit in the signal transmission direction 705 until the data input pin of the flip-flop 710 is identified. The input data pin Data_in may be electrically connected to the flip-flop 710 or coupled to the data input pin of the flip-flop 710 through the intermediate circuit 702. The intermediate circuit 702 may contain standard cells.

Case II: Where the Start Point of Tracing is the Output Data Pin.

Figure 8:
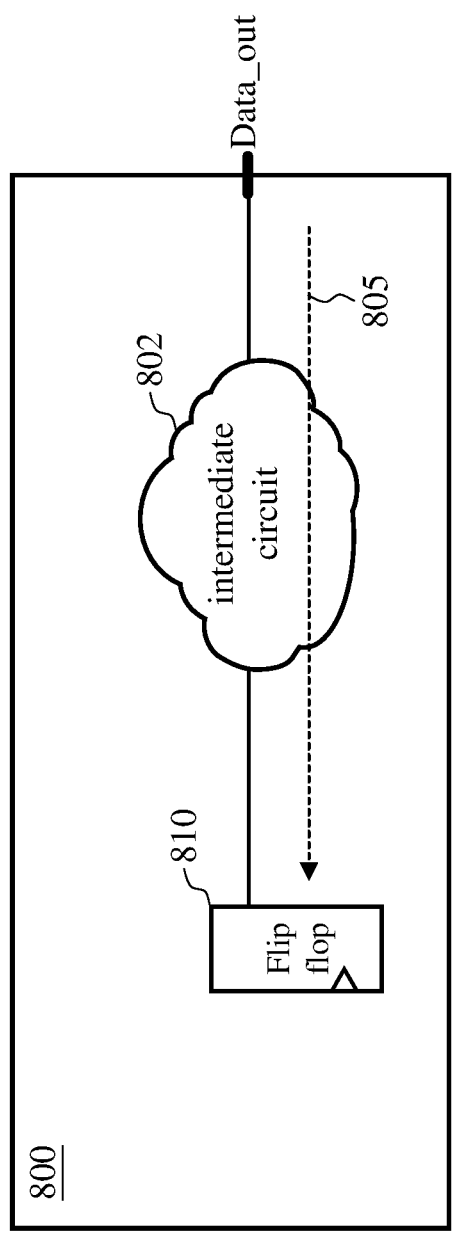
FIG. 8 illustrates another simplified schematic diagram of an IC to be detected.

Reference is made to FIG. 8 which is another simplified schematic diagram of an IC to be detected. In step S360, starting from the output data pin Data_out of the IC 800, the processing unit 120 traces the circuit in the signal source direction 805 until the flip-flop 810 is identified. The output data pin Data_out may be electrically connected to the data output pin of the flip-flop 810 or coupled to the data output pin of the flip-flop 810 through the intermediate circuit 802. The intermediate circuit 802 may contain standard cells.

Note that in one embodiment of the present invention, the processing unit 120 stops tracing the path after identifying the target flip-flop in step S360. In some embodiments, the target flip-flop identified by the processing unit 120 in step S360 is one of the flip-flops identified in step S350.

Reference is made to FIG. 3 again. After step S360 is completed, the processing unit 120 determines the relations between the data pin(s) and the clock pin(s) according to the data signal (or data connection) and the clock signal (or clock connection) of the target flip-flop (Step S370). For example, if the target flip-flop is the flip-flop 210-2 in FIG. 2, the processing unit 120 determines in this step that the input data pin Din-2 is related to the input clock pin CLK-1, that is, the processing unit 120 determines that the clock pin related to the input data pin Din-2 is the input clock pin CLK-1. In another example, if the target flip-flop is the flip-flop 220-m in FIG. 2, the processing unit 120 determines in this step that the output data pin Dout-m is related to both the input clock pin CLK-1 and the input clock pin CLK-2, that is, the processing unit 120 determines that the clock pins related to the output data pin Dout-m are the input clock pin CLK-1 and the input clock pin CLK-2.

FIG. 9 is a detailed flow of an embodiment of step S370 in FIG. 3. In some embodiments, when the IC to be detected includes a selection circuit, step S370 further includes the sub-step S910: when the processing unit 120 determines that the data pin is related to a first clock pin coupled to the selection circuit, the processing unit 120 determines that the data pin is related to a second clock pin coupled to the selection circuit. For example, as shown in the IC 200 of FIG. 2, since the circuit description file of the IC 200 describes that the inputs 232 and 234 of the selection circuit 230 are respectively coupled to the input clock pin CLK-1 and the input clock pin CLK-2, even if the selection circuit 230 selects one of the input clock pin CLK-1 and the input clock pin CLK-2 to be active in the default state of the output 236 (i.e., the input clock of the flip-flop 220-m is coupled to one of the input clock pin CLK-1 and the input clock pin CLK-2), the processing unit 120 still can determine, according to the circuit description file, that the output data pin Dout-m is related to both the input clock pin CLK-1 and the input clock pin CLK-2.

Reference is made to FIG. 3. After step S370 is completed, the processing unit 120 determines whether all data pins of the IC 200 have been processed (step S380). If the result of step S380 is positive, the processing unit 120 generates a report of related clock pin(s) 160 (step S390) and ends the detection process. If the result of step S380 is negative, the processing unit 120 repeats steps S360 and S370 until all data pins are processed.

Table 1 is an example of the report of related clock pin(s) 160 in accordance with the present invention. The report of related clock pin(s) 160 corresponds to the IC 200. Note that because the flip-flop 220-m is coupled to the selection circuit 230, the clock pins related to the output data pin Dout-m are the input clock pin CLK-1 and the input clock pin CLK-2.

TABLE 1

| data pin | related clock pin(s) |
|---|---|
| Din-1 | CLK-1 |
| Din-2 | CLK-1 |
| Din-n | CLK-1 |
| Dout-1 | CLK-2, CLK-3 |
| Dout-2 | CLK-2, CLK-3 |
| Dout-m | CLK-1, CLK-2 |

Steps S350 and S360 in FIG. 3 can be performed using the depth-first search algorithm, the breadth-first search algorithm or other algorithms Steps S350 and S360 further include a sub-step S1010 (as shown in FIG. 10): stopping tracing the circuit when the power node or the ground node is identified. Steps S330 and S1010 help reduce narrow the circuit search range and execution time of steps S350 and S360.

The algorithm of the present invention can be implemented as a computer program product (e.g., software, firmware, or a combination thereof) containing multiple program instructions. The computer program product can be stored in a computer-readable recording medium (e.g., a volatile memory, a non-volatile memory, etc.). A computer which has a computing unit (e.g., a CPU, a microprocessor, a microcontroller, or the like) with program execution capabilities loads and executes the program instructions to implement the method of the present invention.

The shape, size, and ratio of any element and the step sequence of any flow chart in the disclosed figures are exemplary for understanding, not for limiting the scope of this invention. Except for the steps which should be performed in a specific sequence, the sequences of the steps in the flowchart of the present invention can be adjusted in accordance with practical applications, and some or all of the steps can even be performed simultaneously. In addition, each of the foregoing modules or steps can be implemented by hardware, software, or firmware according to the demands of the designer.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of detecting relations between pins of a circuit, comprising:
   (A) retrieving from a memory a circuit description file describing the circuit;
   (B) retrieving at least one data pin and at least one clock pin of the circuit;
   (C) converting, by a processing unit, the circuit from a transistor level to a cell level based on the circuit description file;
   (D) tracing the circuit in the cell level to identify a plurality of flip-flops coupled to the clock pin;
   (E) tracing the circuit in the cell level to identify a target flip-flop coupled to the data pin; and
   (F) determining a relation between the data pin and the clock pin according to a data signal and a clock signal of the target flip-flop, wherein the relation between the data pin and the clock pin is used in a static timing analysis of the circuit.

2. The method of claim 1, further comprising:
   (G) identifying a power node and a ground node in the circuit before step (D);
   wherein step (D) comprises:
   (D1) stopping tracing the circuit when the power node or the ground node is identified.

3. The method of claim 1, further comprising:
   (G) identifying a power node and a ground node in the circuit before step (D);
   wherein step (E) comprises:
   (E1) stopping tracing the circuit when the power node or the ground node is identified.

4. The method of claim 1, wherein the clock pin is an output clock pin of the circuit, step (D) comprising:
   (D1) using the output clock pin as a start point;
   (D2) tracing the circuit in a signal source direction;
   (D3) searching for the flip-flops in a signal transmission direction; and
   (D4) when the flip-flops are not identified in step (D3), repeating steps (D2) and (D3) until the flip-flops are identified.

5. The method of claim 1, wherein the clock pin is a first clock pin, step (B) further comprises retrieving a second clock pin of the circuit, the circuit description file describes a selection circuit having a first input and a second input, the first clock pin and the second clock pin are respectively coupled to the first input and the second input of the selection circuit, step (F) further comprising:
   (F1) when the data pin is determined to be related to the first clock pin, determining that the data pin is related to the second clock pin.

6. The method of claim 1, wherein the target flip-flop is one of the flip-flops.

7. A computer-readable recording medium which stores a computer program product comprising a plurality of program instructions, wherein after a computer loads and executes the program instructions, following steps are carried out:
   (A) retrieving from a memory a circuit description file describing a circuit;
   (B) retrieving at least one data pin and at least one clock pin of the circuit;
   (C) converting the circuit from a transistor level to a cell level based on the circuit description file;
   (D) tracing the circuit in the cell level to identify a plurality of flip-flops coupled to the clock pin;
   (E) tracing the circuit in the cell level to identify a target flip-flop coupled to the data pin; and
   (F) determining a relation between the data pin and the clock pin according to a data signal and a clock signal of the target flip-flop, wherein the relation between the data pin and the clock pin is used in a static timing analysis of the circuit.

8. The computer-readable recording medium of claim 7, wherein after the computer loads and executes the program instructions, following steps are further carried out:
   (G) identifying a power node and a ground node in the circuit before step (D);
   wherein step (D) comprises:
   (D1) stopping tracing the circuit when the power node or the ground node is identified.

9. The computer-readable recording medium of claim 7, wherein after the computer loads and executes the program instructions, following steps are further carried out:
   (G) identifying a power node and a ground node in the circuit before step (D);
   wherein step (E) comprises:
   (E1) stopping tracing the circuit when the power node or the ground node is identified.

10. The computer-readable recording medium of claim 7, wherein the clock pin is an output clock pin of the circuit, step (D) comprising:
    (D1) using the output clock pin as a start point;
    (D2) tracing the circuit in a signal source direction;
    (D3) searching for the flip-flops in a signal transmission direction; and
    (D4) when the flip-flops are not identified in step (D3), repeating steps (D2) and (D3) until the flip-flops are identified.

11. The computer-readable recording medium of claim 7, wherein the clock pin is a first clock pin, step (B) further comprises retrieving a second clock pin of the circuit, the circuit description file describes a selection circuit having a first input and a second input, the first clock pin and the second clock pin are respectively coupled to the first input and the second input of the selection circuit, step (F) further comprising:
    (F1) when the data pin is determined to be related to the first clock pin, determining that the data pin is related to the second clock pin.

12. The computer-readable recording medium of claim 7, wherein the target flip-flop is one of the flip-flops.

13. A method performed by a processing unit prior to a static timing analysis of a circuit, comprising:
    (A) retrieving from a memory a circuit description file describing the circuit;
    (B) retrieving at least one data pin and at least one clock pin of the circuit;
    (C) tracing the circuit in a cell level to identify a plurality of flip-flops coupled to the clock pin;

(D) tracing the circuit in the cell level to identify a target flip-flop coupled to the data pin; and (E) determining a relation between the data pin and the clock pin according to a data signal and a clock signal of the target flip-flop, wherein the relation between the data pin and the clock pin is used in the static timing analysis.

14. The method of claim 13, further comprising:

(F) identifying a power node and a ground node in the circuit before step (C);

wherein step (C) comprises:

(C1) stopping tracing the circuit when the power node or the ground node is identified.

15. The method of claim 13, further comprising:

(F) identifying a power node and a ground node in the circuit before step (C);

wherein step (D) comprises:

(D1) stopping tracing the circuit when the power node or the ground node is identified.

16. The method of claim 13, wherein the clock pin is an output clock pin of the circuit, step (C) comprising:

(C1) using the output clock pin as a start point;

(C2) tracing the circuit in a signal source direction;

(C3) searching for the flip-flops in a signal transmission direction; and (C4) when the flip-flops are not identified in step (C3), repeating steps (C2) and (C3) until the flip-flops are identified.

17. The method of claim 13, wherein the clock pin is a first clock pin, step (B) further comprises retrieving a second clock pin of the circuit, the circuit description file describes a selection circuit having a first input and a second input, the first clock pin and the second clock pin are respectively coupled to the first input and the second input of the selection circuit, step (E) further comprising:

(E1) when the data pin is determined to be related to the first clock pin, determining that the data pin is related to the second clock pin.

18. The method of claim 13, wherein the target flip-flop is one of the flip-flops.

* * * * *